United States Patent [19]

Soltani

[11] Patent Number: 5,165,141
[45] Date of Patent: Nov. 24, 1992

[54] SPRING LOADED HEAVY DUTY CASTER SYSTEM FOR SUPPORTING A FLUIDIZED PATIENT SUPPORT SYSTEM

[75] Inventor: Sohrab Soltani, Charleston, S.C.

[73] Assignee: SSI Medical Services, Inc., Charleston, S.C.

[21] Appl. No.: 640,230

[22] Filed: Jan. 11, 1991

[51] Int. Cl.⁵ .................................. B60B 33/00
[52] U.S. Cl. ........................................ 16/44; 5/510
[58] Field of Search .................. 16/44, 47, 48; 5/510, 5/453

[56] References Cited

U.S. PATENT DOCUMENTS

| | | | |
|---|---|---|---|
| 1,099,075 | 6/1914 | Smith | 16/44 |
| 1,409,150 | 3/1922 | Blood . | |
| 2,294,807 | 9/1942 | Schultz, Jr. | 16/44 |
| 3,032,805 | 5/1962 | Skupas et al. | 16/44 |
| 3,337,230 | 8/1967 | Golding | 16/44 |
| 3,428,973 | 2/1969 | Hargest et al. . | |
| 3,866,606 | 2/1975 | Hargest . | |
| 3,997,938 | 12/1976 | Pinaire et al. | 16/47 |
| 4,483,029 | 11/1984 | Paul | 5/453 |
| 4,564,965 | 1/1986 | Goodwin | 5/453 |
| 4,572,533 | 2/1986 | Ellis et al. | 16/44 |
| 4,637,083 | 1/1987 | Goodwin | 5/453 |
| 4,672,699 | 6/1987 | Goodwin . | |
| 4,942,635 | 7/1990 | Hargest et al. | 5/453 |
| 5,014,391 | 5/1991 | Schulte | 16/44 |

FOREIGN PATENT DOCUMENTS

| | | | |
|---|---|---|---|
| 3513068 | 10/1986 | Fed. Rep. of Germany | 16/40 |
| 61-24602 | 2/1986 | Japan | 16/44 |
| 678471 | 9/1952 | United Kingdom | 16/44 |
| 852772 | 11/1960 | United Kingdom . | |

OTHER PUBLICATIONS

I.B.M. Technical Disclosure Bulletin, vol. 20, No. 5 p. 1688, Oct. 1977.

Primary Examiner—John Sipos
Assistant Examiner—Donald M. Gurley
Attorney, Agent, or Firm—Dority & Manning

[57] ABSTRACT

An undercarriage system apparatus is provided for supporting and transporting a fluidized patient support system above and across a floor. The apparpatus includes a base frame for carrying the fluidized patient support system, a plurality of heavy duty casters, and a pair of disk springs disposed between each caster and the base frame. Each caster includes a central shaft, a shoulder portion disposed about the central shaft for carrying the load, a wheel carriage rotatably mounted via needle bearings to swivel about the central shaft, and a pair of caster wheels mounted side-by-side to rotate about the wheel carriage. The disk springs of each pair are disposed to contact at their outermost edges. Each dish spring desirably has a maximum load capacity rated at least 50% above the nominal load which the disk spring must carry. The base frame defines a sleeve for receiving each central shaft of each caster. An elongated slot is defined through each sleeve. A threaded opening extends radially into the central shaft of each caster about 1 inch above the shoulder. A bolt screws into the threaded opening and rides within the confines of the slot of the sleeve as the disk springs are compressed and uncompressed during shock absorbing events.

3 Claims, 2 Drawing Sheets

SPRING LOADED HEAVY DUTY CASTER SYSTEM FOR SUPPORTING A FLUIDIZED PATIENT SUPPORT SYSTEM

BACKGROUND OF THE INVENTION

The present invention relates to fluidized patient support systems and more particularly to the rolling undercarriage for same.

A fluidized patient support system typically weighs in the vicinity of 1,800 to 2,000 pounds when supporting a patient. An example of such fluidized patient support system is disclosed in U.S. Pat. No. 4,942,645 to Hargest et al, which is hereby incorporated herein by this reference. Other examples of fluidized patient support systems are disclosed in U.S. Pat. No. 3,428,973 to Hargest et al. U.S. Pat. No. 3,866,606 to Hargest, U.S. Pat. No. 4,483,029 to Paul, U.S. Pat. Nos. 4,564,965, 4,637,083, and 4,672,699 to Goodwin, the disclosures of each of the foregoing being hereby incorporated herein by this reference. Such systems must be mobile so that they can be moved to different locations within the health care facility as well as to permit their return periodically to a maintenance facility located off-site from the health care facility. Often such fluidized patient support systems must be moved while a patient is occupying the system. Because of the large amount of weight, such systems have relied upon heavy duty axles and wheels to render them mobile. In addition, heavy duty casters have been provided to render such systems mobile.

However, the surfaces over which such casters are rolled are not always level or even. Bumps and depressions are encountered. The traversal of such bumps and depressions produces significant shock loads upon the casters and can damage same. Moreover, such shocks can be felt by the patient occupying the fluidized system, and the potential danger and discomfort posed by such shocks further limits the instances in which such fluidized systems can be moved while a patient occupies same.

OBJECTS AND SUMMARY OF THE INVENTION

It is a principal object of the present invention to provide an undercarriage system for a fluidized patient support system, wherein the undercarriage system enables the patient support system to be moved with confidence over uneven surfaces without fear of damaging the casters or discomforting the patient occupying the fluidized patient support system.

It is another principal object of the present invention to provide an undercarriage system for a fluidized patient support system, wherein the undercarriage system absorbs shocks encountered while moving the patient support system over uneven surfaces.

It also is a principal object of the present invention to provide a shock-absorbing undercarriage system for a fluidized patient support system, wherein the shock-absorbing mechanism is economic as to cost, assembly, durability, and maintenance, yet more than adequately performs its shock-absorbing function.

It is a further principal object of the present invention to provide a shock-absorbing undercarriage system for a fluidized patient support system, wherein the shock-absorbing mechanism is an inconspicuous feature of the fluidized patient support system and of the undercarriage system.

It is a another principal object of the present invention to provide a shock-absorbing undercarriage system for a fluidized patient support system, wherein the shock-absorbing mechanism performs its function over a very short distance of on the order of less than one half inch maximum deflection of the patient support surface of the fluidized patient support system during absorption of the shock.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an undercarriage system for a fluidized patient support system comprises.

In accordance with the present invention, an apparatus is provided for supporting and transporting a fluidized patient support system above and across a floor. As embodied herein, the undercarriage system apparatus of the present invention can include means for carrying the weight of the fluidized patient support system; means for rendering the weight carrying means sufficiently mobile so that the fluidized patient support system can be moved from place to place by being pushed by an attendant of average strength, manually across the floor and steered manually during such movement; and means for absorbing shock loads to the mobility means during movement of the fluidized support system.

One embodiment of the weight carrying means can include a base frame that is configured and disposed to carry the weight of the fluidized patient support system. The base frame can be covered by a shroud for aesthetic purposes. The remaining structural components of the fluidized patient support system are connected directly or indirectly to the base frame.

One embodiment of the mobility means includes a plurality of heavy duty casters connected to and supporting the weight carrying means. For example, the base frame can be constructed with a cylindrical sleeve for receiving the central shaft of each caster. A separate sleeve can be provided at a sufficient number of locations so that a sufficient number of casters can be received at a number of different locations appropriate to provide a stable rolling platform for the fluidized patient support system. Each caster includes a shoulder portion disposed about the central shaft and configured and structured for carrying the load desired to be carried by the caster. Each caster also includes a wheel carriage rotatably mounted to swivel about the central shaft. Each caster also can include at least one caster wheel and preferably a pair of caster wheels mounted side-by-side to rotate about the wheel carriage. The particular dimensional relationships of the various components of the caster are designed to provide sufficient strength and maneuverability to perform the intended function. Needle roller bearings can be provided between the wheel carriage and the central shaft to permit the double wheels to be carried by the wheel carriage close together in a compact configuration that is well suited to facilitating swiveling of the wheels about the central shaft via the wheel carriage. Each caster can be provided with a manually actuatable brake.

One embodiment of the shock absorbing means includes a disk spring, which can be configured in the form of a truncated cone. A separate disk spring is provided between the shoulder portion of each caster and the weight carrying means. Desirably, a second disk spring is disposed between each caster and the weight carrying means so that the outermost edges of the pair of disk springs touches one another. Each disk spring desirably has a maximum load capacity rated at least 50% above the nominal load which the disk spring must carry. A disk spring with a two and one-eighth inch outside diameter and a one and one-eighth inch inside diameter can be provided with a 750 pound maximum eighth inch. Thus, each disk spring has a very high load rating relative to a very small deflection length.

An embodiment of the shock absorbing means also can include a threaded opening defined to extend radially into the central shaft of each caster. The height of the center line of the threaded opening above the shoulder portion of the caster is desirably about 1 inch.

The shock absorbing means also can include at least one sleeve defined as part of the base frame and configured for receiving the central shaft of a caster. The shock absorbing means desirably includes a slot defined through the cylindrical wall of each sleeve and defining an opening configured to elongate in the axial direction of the cylindrical sleeve. The edges of the slot define a cam for receiving a cam follower which engages the edges of the slot and constrains the translational movement of the cam follower within the confines of the edges of the slot.

The shock absorbing means also desirably includes a threaded cylindrical bolt configured to be screwed into the threaded opening of each central shaft of each caster. The bolt is configured in the form of a socket head shoulder screw having a threaded portion, a smooth shoulder portion wider than the threaded portion and just wide enough to be received within the slot defined in the cylindrical sleeve, and a head portion wider than the transverse diameter of the smooth portion of the bolt and wider than the width of the slot defined in the cylindrical sleeve. The threaded bolt can be inserted into the threaded opening after the central shaft is inserted into the sleeve of the base frame. Thus, the smooth portion of the bolt rides within the confines of the slot of the sleeve as the disk springs are compressed and uncompressed during shock absorbing events.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the present preferred embodiments of the present invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover the modifications and variations of this invention provided they come within the scope of the appended claims and their equivalents.

Figure 1:
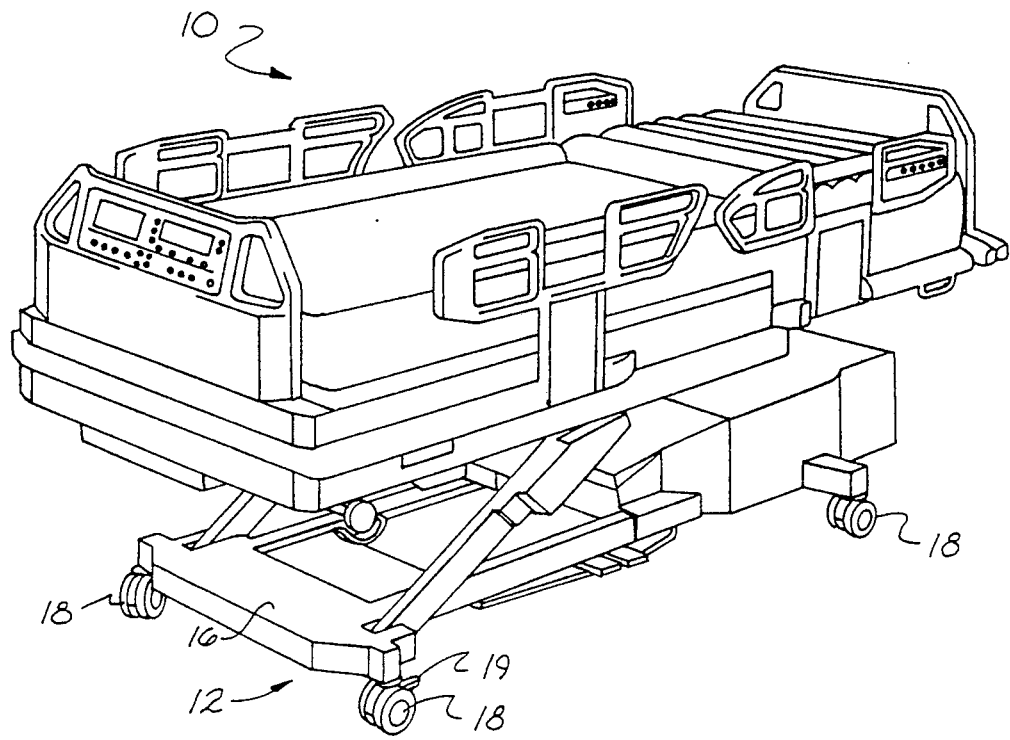
FIG. 1 shows an elevated perspective view of a preferred embodiment of the present invention.

A preferred embodiment of the undercarriage system for a fluidized patient support system, which is indicated generally by the numeral 10, is shown in FIG. 1 and is represented generally by the designating numeral 12.

In accordance with the undercarriage system of the present invention for supporting and transporting a fluidized patient support system above and across a floor, means are provided for carrying the weight of the fluidized patient support system. As embodied herein and shown in FIGS. 1A, 2A, 2B, 2C, and 4 for example, the weight carrying means can include a base frame 14. As shown in FIG. 1 for example, base frame 14 is configured and disposed to carry the weight of fluidized patient support system 10. Because of the substantial weight of the fluidized patient support system, base frame 14 desirably is formed of heavy gauge steel. For aesthetic purposes, the appearance of the base frame can be hidden from view by a shroud 16 (FIG. 1), which can be formed of a molded plastic material or sheet metal for example. Shroud 16 can be carried by base frame 14 and covers same. The remaining structural components of fluidized patient support system 10 are connected directly or indirectly to base frame 14.

In further accordance with the present invention, means are provided for rendering the weight carrying means sufficiently mobile so that the fluidized patient support system can be moved from place to place by being pushed by an attendant of average strength, manually across the floor and steered manually during such movement. A primary function of the mobility means is to facilitate movement of the patient support system by the normal personnel that would be available in the health care facility in which the patient support system is being used. The mobility means should empower such staffing personnel to maintain the patient support system stationary at a particular location and to render such system mobile so that it can be moved to a different location. The mobility means should permit the fluidized patient support system to be moved easily by being pushed and steered across the floor without herculean efforts being expended. Desirably, the mobility means would be connected to the weight carrying means and carry same.

As embodied herein and shown in FIGS. 1, 1A, 2A, 2B, 2C, and 4 for example, the mobility means includes a plurality of heavy duty casters 18. Each caster 18 is disposed to rotatably carry the weight carrying means, such as base frame 14. As shown in FIG. 1 for example, base frame 14 is constructed so that it can receive a plurality of casters 18 at a sufficient number of locations to provide a stable rolling platform for the fluidized patient support system. In the embodiment shown in FIG. 1 for example, base frame 14 is configured to permit mounting of four casters 18, one at each corner of a rectangular configuration of base frame 14. Moreover, each caster 18 desirably is provided with a brake that can be manually operated by engaging a lever 19 (shown in FIG. 1 for example, but not in the other Figs. in order to avoid unduly complicating them).

As shown in FIGS. 1A, 2A, 2B, 2C, and 4 for example, each caster 18 defines a stem in the form of a central shaft 20. A shoulder portion 22 is fixed to and disposed about central shaft 20 and is structured and configured for carrying the load designed to be carried by the caster. Desirably, the height of caster central shaft 20 above the uppermost surface of shoulder portion 22 is about three inches. Moreover, each caster 18 includes a wheel carriage 24 rotatably mounted with suitable bearings to swivel about central shaft 20. Ball bearings can be provided between the underside of shoulder portion 22 and the upper surface of wheel carriage 24 so that shoulder portion 22 can ride on atop wheel carriage 24 as shaft 20 swivels with respect to wheel carriage 24. Furthermore, each caster 18 includes at least one caster wheel 26 rotatably mounted to wheel carriage 24.

Figure 1A:
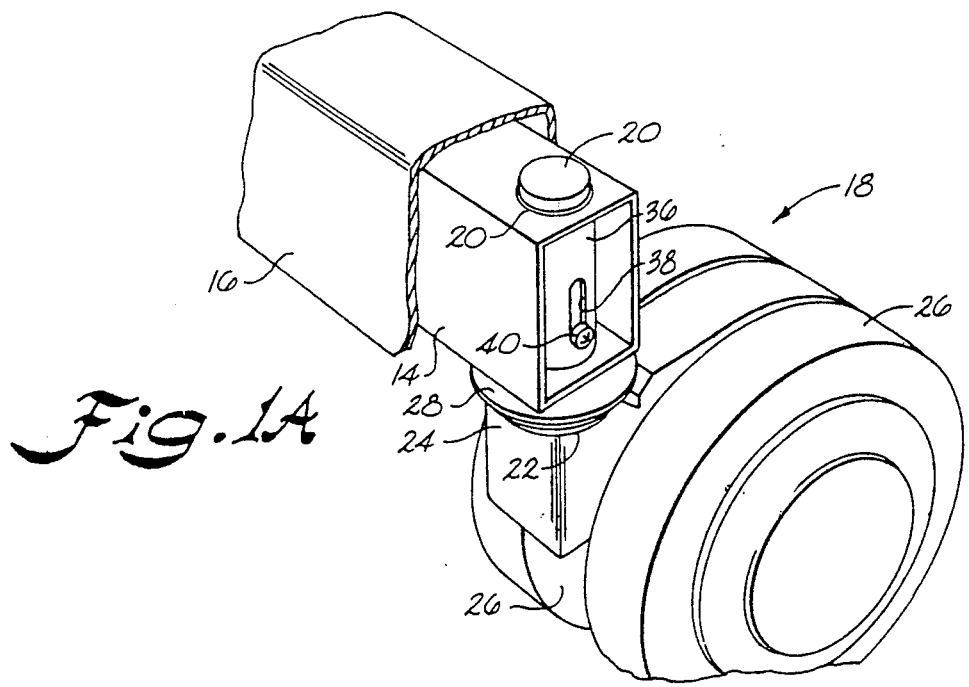
FIG. 1A illustrates an elevated perspective view of components of the preferred embodiment of the present invention with portions cut away for ease of viewing certain features of the invention.
Figures 3, 4:
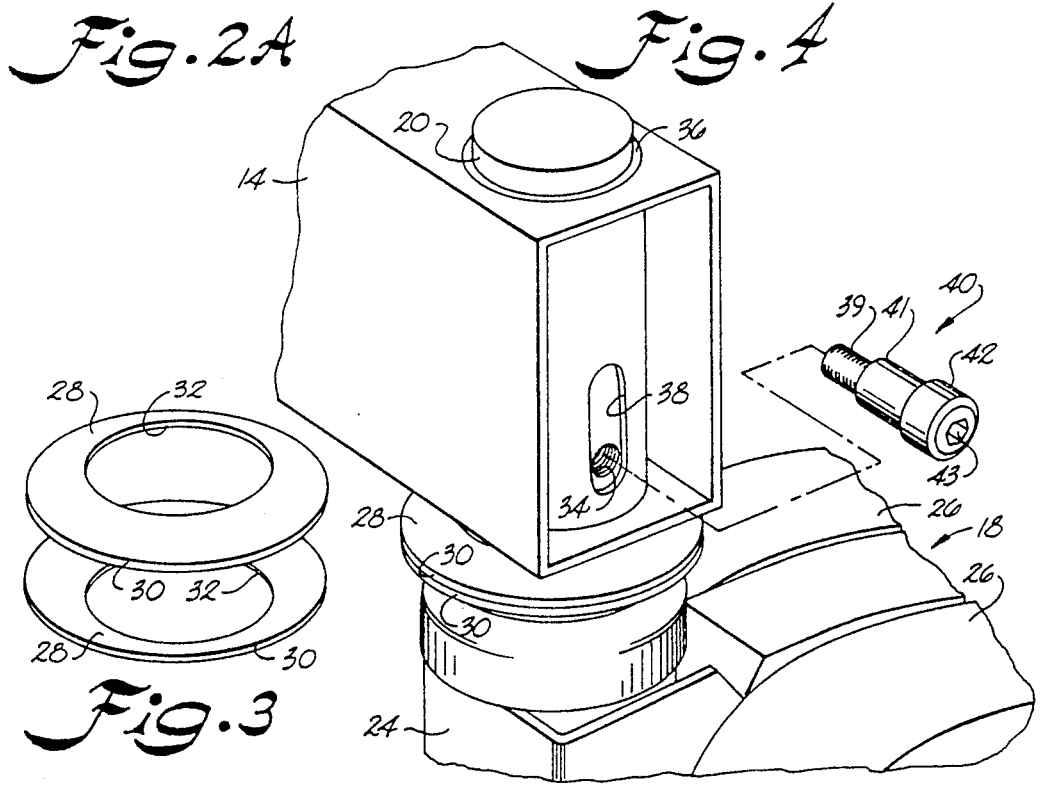
FIG. 3 illustrates an elevated perspective view of components of a preferred embodiment of the present invention.
FIG. 4 illustrates an elevated perspective view of components of the preferred embodiment of the present invention with portions cut away for ease of viewing certain features of the invention.

For the sake of stability of the fluidized patient support system, desirably the diameter of each wheel 26 of caster 18 is no more than six inches, and the overall height of the caster from the bottom of wheel 26 to the uppermost surface of shoulder portion 22 of caster 18 desirably measures about six and one-half inches. The distance separating the central axis of symmetry of central shaft 20 and the rotational axis of symmetry of caster wheel 26 is desirably about two inches. However, in order to carry the approximately 2,000 pound weight of the patient-occupied fluidized patient support system using only four casters with six inch diameter wheels, it is desirable that each caster have two wheels 26, with each wheel rated at 600 pounds capacity. Thus, as shown in FIGS. 1, 1A, and 4 for example, each caster 18 desirably includes a pair of caster wheels 26 mounted side-by-side.

However, in order to avoid impeding the swivelling of the casters about their central shafts 20, such side-by-side wheels 26 must be mounted with their central axes of rotation close enough together. If such wheels 26 have too much distance between them, in other words too broad a stance, their ability to swivel about central shaft 20 in a relatively free fashion is impeded. If the swivelling of the caster wheels is impeded, the casters would tend to become stuck, and thus the direction of the fluidized patient support system could not easily be changed once the system was put into motion. This would make it difficult to steer the patient support system during movement of same.

Accordingly, to facilitate the swivelling of wheel carriage 24 about central shaft 20, needle roller bearings (not shown) can be provided between wheel carriage 24 and central shaft 20. The needle roller bearings are a desirable means of permitting the double wheels carried by wheel carriage 24 to be mounted close together in a compact configuration. The particular configuration of a suitable dual wheel heavy duty caster with appropriate needle roller bearings depends on the number of casters in the particular undercarriage design and on the nominal load capacity of each caster required by the particular design.

However, sudden shocks to the bearings, such as the needle roller bearings, between the caster's stem and wheel carriage can damage same. In yet further accordance with the present invention, means are provided for absorbing shock loads to the mobility means during movement of the fluidized support system. The shock absorbing means desirably is disposed between the weight carrying means and the mobility means. As embodied herein and shown in FIGS. 1A, 2A, 2B, 2C, 3, and 4 for example, the shock absorbing means desirably includes at least one disk spring 28. Each disk spring 28 desirably is disposed between the weight carrying means and the mobility means. Desirably, at least one disk spring 28 is provided between each caster shoulder portion 22 and base frame 14. Thus, where there are a plurality of casters, a plurality of disk springs 28 comprises the shock absorbing means. Each one of the disk springs is disposed between the base frame and a different one of the casters.

Moreover, as embodied herein and shown in FIGS. 1A, 2A, 2B, 2C, 3, and 4 for example, the shock absorbing means desirably includes a second plurality of disk springs 28. Each one of the second plurality of disk springs is disposed between base frame 14 and a different one of casters 18 to form a pair of disk springs 28 between each one of the casters and base frame 14. Furthermore, as shown in FIGS. 1A, 2A, 2B, 2C, 3, and 4 for example, each one of disk springs 28 forming each pair of disk springs preferably is disposed with its outermost or widest edge 30 (see FIGS. 3 and 4) contacting the widest edge 30 of the other disk spring in the pair of disk springs.

Figures 2A, 2B, 2C:
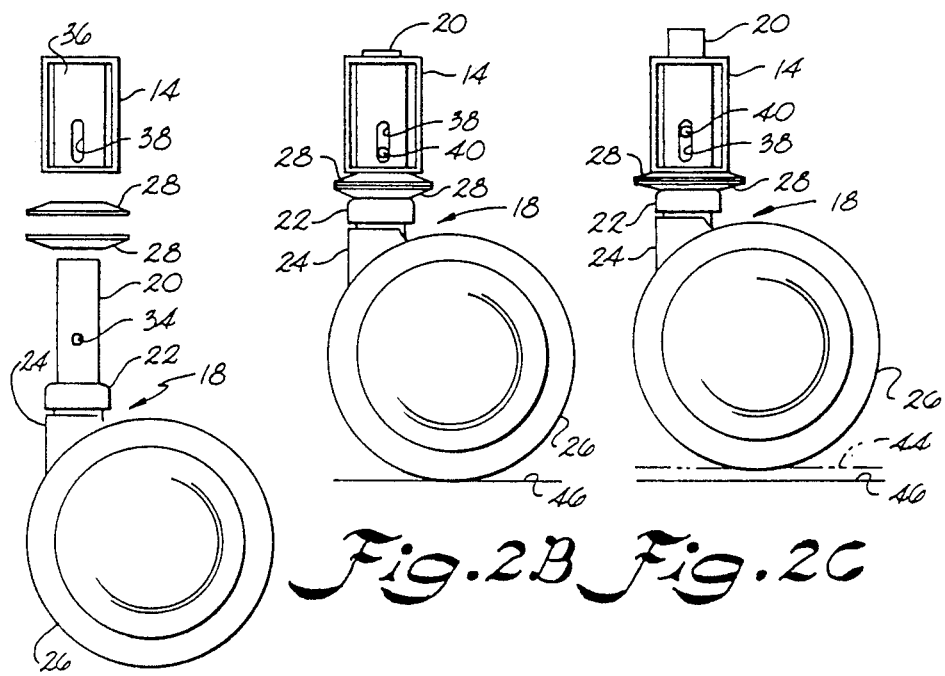
FIG. 2A illustrates a side plan view of components of a preferred embodiment of the present invention prior to assembly.
FIG. 2B illustrates a side plan view of assembled components of a preferred embodiment of the present invention in an unshocked condition.
FIG. 2C illustrates a side plan view of components of a preferred embodiment of the present invention in a shock absorbing condition.

Each disk spring desirably has a maximum load capacity rated at least 50% above the nominal load which the disk spring must carry. Assuming that the total weight of the fluidized patient support system with a patient occupying same is between 1800 and 2000 pounds, if four casters are provided, each caster need carry no more than 500 pounds. In such a configuration of the undercarriage system of the present invention, each disk spring should be capable of sustaining about 750 pounds before it will compress into a flat disk. Since the total rating of each disk spring is 750 pounds and the weight carried by each caster is no more than 500 pounds, the disk springs are unlikely to be fully deflected when carrying the weight of the fully loaded patient support system. Accordingly, when the patient support system is being moved and encounters a bump, such as when the patient support system is pushed over the raised threshold between a hallway and a room in the health care facility, the two disk springs take up the shock produced by the sudden movement across the threshold. This is illustrated schematically in FIGS. 2B and 2C. FIG. 2B illustrates the condition of disk springs 28 in the unshocked condition prior to engaging a bump. FIG. 2C illustrates the compressed condition of disk springs 28 when absorbing the shock of the bump.

Desirably, each such disk spring 28 is formed from spring steel in a truncated conical shape, which appears trapezoidal when viewed in plan from the side as shown in FIG. 2A for example. As shown in FIG. 3 from an elevated perspective for example, each disk spring 28 can be configured with an annular circular symmetry, and in its uncompressed state can have about a two and one-eighth inch outside diameter at its outermost edge 30 and a one and one-eighth inch inside diameter at its innermost edge 32. Desirably, the height of each such disk spring is about one-eighth inch in its uncompressed condition shown in FIG. 2A for example. With a 750 pound maximum load capacity rating over a one-eighth inch maximum deflection distance, each disk spring 28 has a very high load rating relative to a very small deflection length. Two disk springs are preferably superimposed one atop the other with their outermost edges 30 touching in order to have a 1500 pound maximum load capacity over a slightly larger deflection distance of one-quarter inch.

Moreover, as embodied herein and shown in FIGS. 2A and 4 for example, the shock absorbing means desirably includes a circularly cylindrical threaded opening 34 defined to extend radially into central shaft 20 of each caster 18. Desirably, threaded opening 34 defines a quarter inch diameter, twenty threads per inch tapped hole. The height of the center line of threaded opening 34 above shoulder portion 22 of caster 18 is desirably about one inch.

As embodied herein and shown in FIGS. 1A and 4 for example, the shock absorbing means desirably includes at least one sleeve 36 defined as part of base frame 14 and configured for receiving central shaft 20 of caster 18. As shown in FIGS. 1A and 4 for example, sleeve 36 can define an annular steel member having cylindrical inner and outer surfaces. Each cylindrical surface defines a concentric circular transverse cross-sectional perimeter.

As embodied herein and shown in FIGS. 1A, 2A, 2B, 2C, and 4 for example, the shock absorbing means desirably includes a slot 38 defined through the cylindrical wall of each sleeve 36. Each slot 38 is defined as an opening having a configuration that elongates in the axial direction of the cylindrical sleeve. The edges of slot 38 define a cam for receiving a cam follower which engages the edges of slot 38 and constrains the translational movement of the cam follower within the confines of the edges of slot 38. Typical dimensions for slot 38 are three eighths inch wide and one half inch long.

As shown in FIG. 4 for example, the shock absorbing means desirably includes a partially threaded cylindrical bolt 40 (size is exaggerated in FIG. 4 for the sake of clarity) configured to be screwed into threaded opening 34 of central shaft 20 of caster 18. As shown in FIG. 4 for example, each threaded bolt (generally designated 40) is desirably formed as a socket head shoulder screw and is configured with a smooth circularly cylindrical shoulder portion 41 that is wider than the transverse diameter of the elongated cylindrical threaded portion 39 of bolt 40. The diameter of shoulder portion 41 is configured to be about the same size as the width of slot 38. Each bolt 40 desirably defines a head portion 42. The diameter of head portion 42 is wider than the diameter of shoulder portion 41. For example, a shoulder portion diameter of about three eighths inch will desirably have a head portion with a diameter of about one-half inch or nine-sixteenths inch. Each head portion 42 defines a polygonal socket 43 along the central axis of bolt 40. The polygonal socket 43 is configured to receive a tool such as an Allen type wrench so that, as indicated by the dashed zig-zag line in FIG. 4, bolt 40 can be screwed into threaded opening 34 after central shaft 20 is inserted into sleeve 36 of base frame 14. Shoulder portion 41 of bolt 40 rides within the confines of slot 38 of sleeve 36. Thus, central shaft 20 of caster 18 carries a cam follower in the form of bolt 40 for engaging slot 38 of sleeve 36 when caster 18 is received by sleeve 36.

Note in FIG. 2C that bolt 40 (shown without head portion 42 for the sake of clarity) travels vertically to the opposite end of slot 38 during the deflection that is absorbed by the pair of disk springs 28 as caster 18 traverses the threshold (schematically represented by dashed horizontal line 44 above solid horizontal line 46, the latter schematically representing the floor). Thus, shoulder bolt 40 moves vertically in slot 38 in sleeve 36 of base frame 14 over a deflection distance that is determined by the amount of compression applied to disk springs 28 by the shock. Moreover, the length of slot 38, typically about one half inch, serves as a further limit to the maximum deflection which can be caused by sudden shocks to the undercarriage system of the present invention.

Because of the shock absorbing mechanism of the present invention, the shocks encountered by the fluidized support system while traversing the floor are absorbed by the disk spring rather than being applied to any of the caster mechanism that might be subject to damage. This would include needle roller bearings (not shown) that enable wheels 26 of caster 18 to swivel about central shaft 20 of caster 18. The shock absorbing mechanism of the present invention also permits the fluidized patient support system to be moved in a larger number of instances while occupied by a patient, because the patient is less likely to experience sudden harsh vertical movements that might discomfort or harm the patient.

What is claimed is:

1. An undercarriage system for a fluidized patient support system, the undercarriage system comprising:
   (a) a base frame configured and disposed to carry the weight of the fluidized support system;
   (b) a plurality of heavy duty casters,
      i) each said caster including a central shaft and disposed to rotatably carry said frame;
   (c) said frame defining at least one sleeve receiving said central shaft of one of said casters,
      i) each said sleeve defining a slot through said sleeve;
      ii) said slot defining a configuration that is elongated in the axial direction of said sleeve; and
      iii) said central shaft of at least one said casters carrying a cam follower engaging said slot; and,
   (d) a plurality of disk springs,
      i) each one of said disk springs being disposed between said base frame and a different one of said casters.

2. An undercarriage system for a fluidized patient support system, the undercarriage system comprising:
   (a) a base frame configured and disposed to carry the weight of the fluidized support system;
   (b) a plurality of heavy duty casters,
      i) each said caster being disposed to carry said frame,
      ii) each said caster including at least one wheel, iii) each said caster including a wheel carriage to which each said wheel is rotatably mounted,
iv) each said caster defining a central shaft about which said wheel carriage swivels,
v) each said caster defining a shoulder portion disposed about said central shaft,
vi) each said shoulder portion being configured for carrying the load designed to be carried by said caster;
(c) said base frame defining at least one sleeve receiving said central shaft of one said caster,
i) said sleeve defining a slot through said sleeve,
ii) said slot defining a configuration that is elongated in the axial direction of said sleeve,
iii) said central shaft of at least one said caster carrying a cam follower engaging said slot, and
(d) a plurality of disk springs,
i) each one of said disk springs being disposed between said base frame and said shoulder portion of a different one of said casters.

3. A wheeled undercarriage system for supporting and transporting a patient support system, the wheeled system comprising:

a base frame disposed generally beneath said support system and configured to carry the weight of the support system;
a plurality of heavy duty casters, each said caster being configured to support at least 500 pounds;
a plurality of cylindrical sleeves whereby at least one said sleeve is provided for each said caster, said cylindrical sleeves connected to said base frame;
an elongated vertically disposed slot defined in each said cylindrical sleeve, said slots being in operative engagement with an engaging member on said casters so that said casters are provided with a predetermined degree of vertical movement with respect to said base frame, said degree of vertical movement defined by the length of said elongated slots and relative movement of said engaging member with respect to said slot; and
a plurality of disk springs, at least one of said disk springs is disposed between each said caster and said base frame, said disk springs providing shock absorption capability between said casters and said base frame.

* * * * *